United States Patent [19]

Tsuchiya et al.

[11] 4,312,647

[45] Jan. 26, 1982

[54] IODINE ADSORBENT

[75] Inventors: Hiroyuki Tsuchiya; Kiyomi Funabashi; Makoto Kikuchi, all of Hitachi, Japan

[73] Assignee: Hitachi, Ltd., Tokyo, Japan

[21] Appl. No.: 66,041

[22] Filed: Aug. 13, 1979

[30] Foreign Application Priority Data

Aug. 14, 1978 [JP] Japan ................................. 53-98209

[51] Int. Cl.³ ............................................ B01D 53/04
[52] U.S. Cl. .......................................... 55/387; 55/71
[58] Field of Search ................. 55/71, 72, 74, 75, 387, 55/389

[56] References Cited

U.S. PATENT DOCUMENTS

| | | | |
|---|---|---|---|
| 3,257,776 | 6/1966 | Park et al. ................................ | 55/72 |
| 3,429,103 | 2/1969 | Taylor ..................................... | 55/71 |
| 3,429,655 | 2/1969 | Case ..................................... | 55/71 X |
| 3,453,807 | 7/1969 | Taylor ..................................... | 55/71 |
| 3,658,467 | 4/1972 | Maeck ..................................... | 55/71 X |
| 3,762,133 | 10/1973 | Merriman et al. .................. | 55/71 X |
| 3,838,554 | 10/1974 | Wilhelm et al. ........................ | 55/71 |
| 4,016,242 | 4/1977 | Deitz et al. .......................... | 55/71 X |
| 4,036,940 | 7/1977 | McLane et al. ..................... | 55/71 X |
| 4,111,833 | 9/1978 | Evans ................................. | 55/71 X |

*Primary Examiner*—Robert H. Spitzer
*Attorney, Agent, or Firm*—Thomas E. Beall, Jr.

[57] ABSTRACT

An iodine adsorbent comprises a carrier, a film of iodine-adsorbing material or compound deposited on the surface of the carrier, and a layer of organic material coated on the surface of the film, and has a high iodine removal efficiency at a high humidity.

4 Claims, 5 Drawing Figures

IODINE ADSORBENT

This invention relates to an iodine adsorbent, and more particularly to an adsorbent having a good performance to remove radioactive iodine contained in an exhaust gas at a high humidity from a nuclear power plant.

An important problem in nuclear power plants such as nuclear power stations, etc. is an abatement of discharge of radioactive gas, particularly, radioactive iodines comprising elemental iodine ($I_2$) or organic iodines such as methyl iodide ($CH_3I$) as main components from the viewpoint of environmental safety. Heretofore, iodine-removing filters have been provided in the nuclear power stations to prevent an emission of radioactive iodines to the environments when such an accident as a dissolution of nuclear fuel happens to take place. More recently, iodine-removing apparatuses are being provided in emission sources as well as in the housing ventilation systems to make a maximum abatement of the emission of radioactive iodines to the environment even in the normal operation.

One of the emission sources of radioactive iodine is a vent gas from storage tanks for radioactive liquid waste. The main component of the vent gas is air used for stirring the storage tanks, and thus the vent gas contains mists.

Two types of adsorbent for removing iodine are now available, that is, impregnated charcoal and silver zeolite. Furthermore, adsorbents supporting silver nitrate or silver sulfate on alumina are now under development. For example, U.S. Pat. No. 3,838,554 proposes an iodine adsorbent supporting a silver compound on a carrier comprising silicic acid having more than 10% of volume of pores with less than 100 Å and less than 5% of volume of pores with more than 1,000 Å. Furthermore, U.S. patent application Ser. No. 915,136 proposes an iodine adsorbent supporting a metal or metal compound of silver, copper, lead, etc. on an alumina carrier having an average pore size of 200-2,000 Å. However, when the gas contains mists, particularly when the relative humidity is more than 95%, the iodine removal efficiencies of these adsorbents are abruptly lowered.

The present invention is based on a detailed study of adsorption characteristics of iodine adsorbent supporting a silver compound on a carrier at a high humidity.

An object of the present invention is to overcome the disadvantages of the prior art and provide an iodine adsorbent having a less reduction in the iodine removing performance even at a high humidity involving mists.

The present invention is characterized by coating the surface of a film of iodine-adsorbing material or compound deposited on the surface of a carrier with a layer of organic material.

The organic material for the layer of organic material is an organic material having better solvent properties for iodine or iodine compounds than pure water and forming another phase from water, that is, a phase incompatible with water.

The present invention will be described in detail, referring to the accompanying drawings.

Figure 1:
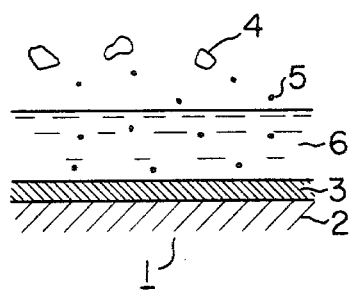
FIG. 1 is a schematic view showing a state of a surface of the conventional iodine adsorbent supporting silver at a high humidity.

In FIG. 1, an adsorption state of iodine adsorbent at a high humidity is shown. A silver compound 3 is supported on the surface of a carrier 2 to form an iodine adsorbent 1. The iodine adsorbent 1 is placed in a vent gas at a high humidity containing a large amount of mists 4. The vent gas also contains $CH_3I$ 5. FIG. 1 is a schematic view, and actually there are a large number of fine pores on the surface of the iodine adsorbent 1. The mists 4 are attached to the surface of the silver compound 3 to cover the surface of the iodine adsorbent 1 with a water film 6. $CH_3I$ 5 in the gas must be dissolved in the water film 6 in order to react with the silver compound 3. However, the solubility of $CH_3I$ in water is as small as 2 g/100 ml at the ordinary temperature, and thus the water film 6 becomes a kind of resistance. Consequently, a rate of reaction of $CH_3I$ 5 with the silver compound 3 is considerably lowered, as compared with the case where there is none of the water film 6. Thus, when the iodine adsorbent 1 is used in the atmosphere containing the mists 4, a larger amount of the iodine adsorbent 1 must be employed, and consequently a larger adsorption apparatus must be used. Usually, the mists 4 in the gas are removed by a separator provided with a wire mesh, but fine mists with particle sizes of less than 1μ are hardly removed. To ensure the removal of such fine mists, a preheater must be provided at the upstream side of the iodine-removing apparatus, thereby lowering the relative humidity. However, the preheater needs an additional energy to heat the gas, and also complicates the iodine-removing apparatus.

Since the cause for lowering the performance of iodine adsorbent 1 to remove $CH_3I$ is the water film 6 formed on the surface of iodine adsorbent 1, preventing the formation of the water film 6 on the surface of iodine adsorbent 1 in the atmosphere containing the mists 4 will prevent the $CH_3I$ removal efficiency from lowering.

The present inventors have found that the formation of water film can be prevented and consequently the lowering of the performance to remove the iodine can be prevented by forming a film of organic material having a hydrophobic property, a good solvent for organic iodine and a low vapor pressure on the surface of iodine adsorbent 1.

Figure 2:
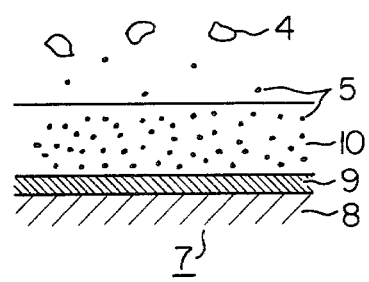
FIG. 2 is a schematic view showing a state of a surface of one preferable embodiment of the present iodine adsorbent supporting silver at a high humidity.

A preferable embodiment of the present invention is schematically shown in FIG. 2, where silver sulfate ($Ag_2SO_4$) 9 is impregnated on the surface of alumina carrier 8 having a large number of fine pores, and a film of organic material 10 is further formed on the surface of the silver sulfate film 9, thereby forming an iodine adsorbent 7. The organic material of the film 10 has a hydrophobic property, and thus no mists 4 are attached to the surface of iodine adsorbent 7, or no water film 6 is formed. Furthermore, the organic material a good solvent for organic iodine, and thus never acts as a resistance to the movement of organic iodine toward the surface of silver sulfate film 9. Furthermore, the organic material has a low vapor pressure, and thus loss of the organic material from the surface of iodine adsorbent by evaporation can be prevented.

The organic material for the film 10 is the one in which the solubility is $CH_3I$ of 100 g/100 ml or more, and which has a vapor pressure of $10^{-5}$ torr or less, and includes dioctyl phthalate (DOP), dioctyl sebate (DOS), fluorohydrocarbons, silicon oil, etc.

Figure 3:
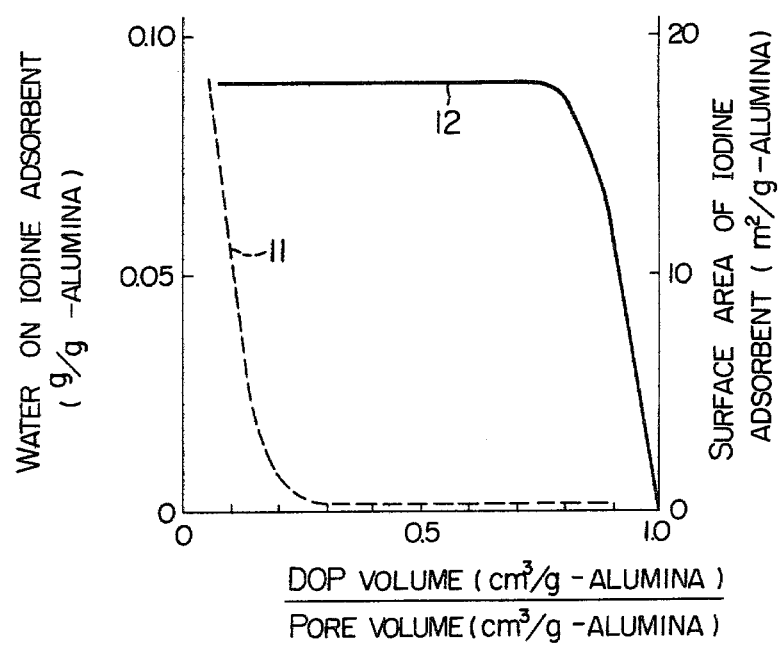
FIG. 3 is a characteristic diagram showing relations between volume of coated DOP on the adsorbent, volume of water attached on the adsorbent, and surface area of the adsorbent.

The present inventors have experimentally studied an optimum coating amount of the organic material. In FIG. 3, relations between volume of coating DOP, amount of water attached, and surface area of iodine adsorbent are shown by using the iodine adsorbent 7 comprising a silver sulfate film 9 formed on an alumina carrier 8 having a pore volume of 0.400 cc/g, the silver sulfate film 9 being further coated with an organic material film 10 consisting of DOP, as shown in FIG. 2. Characteristic curve 11 shows an amount of water attached on the iodine adsorbent, and characteristic curve 12 an available surface area of iodine adsorbent. Experiment was conducted in a vent gas at a relative humidity of 95%. A DOP film 10 is gradually formed on the silver sulfate film 9 with increasing volume of DOP. When the volume of DOP is increased to more than 0.2 of the pore volume of alumina carrier 8, the surface of iodine adsorbent 7 is completely coated by the DOP film 10. When the volume of DOP is further increased to more than 0.8 of the pore volume, the pores in the iodine adsorbent 7 are filled with DOP, and thus the surface area of iodine adsorbent 7 is abruptly reduced. In that case, a rate of reaction becomes lower. It is seen from the foregoing that the volume of DOP coating must be in a range of 0.2–0.8 times the pore volume of alumina carrier 8.

When DOS, fluorohydrocarbon and silicon oil were used as the organic material for the film, results similar to that of FIG. 3 were obtained.

Figure 4:
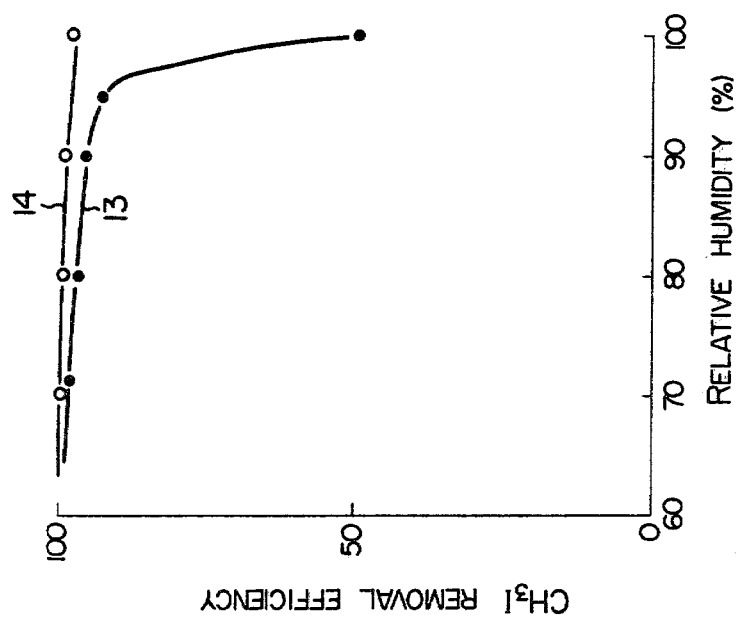
FIG. 4 is a characteristic diagram showing relations between relative humidity and $CH_3I$ removal efficiency when silver sulfate is used in the iodine adsorbent of FIG. 2.

Furthermore, the present inventors have experimentally studied relations between relative humidity and $CH_3I$ removal efficiency with an iodine adsorbent having a DOP film coated on a silver sulfate film 9 at 0.5 cc of DOP/g of alumina at a temperature of 30° C., a gas linear velocity of 20 cm/sec, and a thickness of adsorbent layer of 5 cm. The results are shown in FIG. 4, where the results with the conventional iodine adsorbent 1 having no DOP film are plotted as characteristic curve 13, and those of the present iodine adsorbent 7 are plotted as characteristic curve 14. $CH_3I$ removal efficiency of the conventional iodine adsorbent 1 is lowered to about 50% at a relative humidity of 100%, where mists 4 exist, whereas $CH_3I$ removal efficiency of the present iodine adsorbent 7 is about 97% at the same relative humidity. It has been confirmed that the $CH_3I$ removal efficiency of the present iodine adsorbent is high even in the atmosphere at a high humidity containing mists 4.

The present iodine adsorbent 7 having a DOP film 10 can be prepared in the following manner.

A predetermined amount of DOP is dissolved in acetone or alcohol, and an adsorbent supporting a silver compound is dipped in the resulting solution for about 3 hours. Then, the adsorbent is degasified by heating at about 150° C. for about one hour. The volume of coating DOP can be adjusted by changing a DOP concentration in acetone or alcohol.

Other organic materials than DOP can be applied to adsorbents in the same manner as above.

It is seen from the foregoing that the present iodine adsorbent 7 has a high $CH_3I$ removal efficiency even in the atmosphere at a high humidity containing the mists, and thus the iodine-removing apparatus can be made compact without any need for a preheater.

The present inventors have further studied a loss of the organic material from the film 10 on the iodine adsorbent 7 by evaporation, etc. during the service of the iodine adsorbent 7.

Air was passed through adsorbents, each having one of organic materials given in the following Table at a coating rate of 0.2 cm³/g of adsorbent in thickness of 5 cm at 50° C. maximum and a linear air velocity of 20 cm/sec for 24 hours to obtain an evaporation loss of the organic material from film 10.

A yearly loss (%) of the organic material from the film by continuous air passage (365 days) was calculated from the resulting data for 24 hours. Results are given in the following Table.

TABLE

| Organic materials | Yearly loss (%) |
|---|---|
| DOP | 7.4 |
| DOS | 1.7 |
| Silicone oil | |
| DC703 (trademark of Dow Corning, USA) | 9.6 |
| DC704 (trademark of Dow Corning, USA) | 1.7 |
| DC704 (trademark of Dow Corning, USA) | 0.1 |
| Fluorohydrocarbon oil | |
| YVAC40/11 (trademark of Monte-Edison, Italy) | 0.01 |
| YVAC18/8 (trademark of Monte-Edison, Italy) | 5.3 |
| Krytox 143AD (trademark of DuPont, USA) | 5.7 |

The yearly loss of organic material from the film 10 is less than 10% during the service of the present iodine adsorbent 7, and no substantial influence will be given to the prolonged use of the adsorbent by the loss of organic material.

In the foregoing embodiment, silver sulfate is used as the silver compound, but the present invention is not limited thereto.

Figure 5:
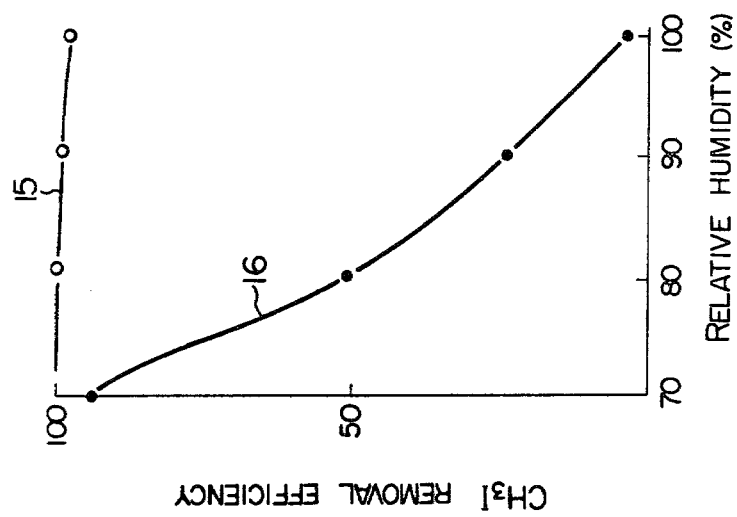
FIG. 5 is a characteristic diagram showing relations between relative humidity and $CH_3I$ removal efficiency when silver sulfite is used in the iodine adsorbent of FIG. 2.

In FIG. 5, results of using silver sulfite ($Ag_2SO_3$) in place of silver sulfate and measuring $CH_3I$ removal efficiency under the same conditions as in FIG. 4 are shown, where characteristic curve 15 represents the present iodine adsorbent 7 with silver sulfite having a DOP film coated thereon, and characteristic curve 16 represents the conventional iodine adsorbent 1 with silver sulfite having no DOP film. $CH_3I$ removal efficiency of the conventional iodine adsorbent 1 with $Ag_2SO_3$ as the silver compound is lowered at a relative humidity of more than 70%, whereas that of the present iodine adsorbent 7 with $Ag_2SO_3$ and a DOP film thereon is not lowered at all. This is because a water film 6 is partly formed on the conventional iodine adsorbent 1 at a relative humidity of more than 70%, and a solubility of $Ag_2SO_3$ in water is higher than that of $Ag_2SO_3$. It is seen from the foregoing that a capacity of the iodine adsorbent to remove $CH_3I$ can be considerably increased by forming a DOP film on the $Ag_2SO_3$ film on the iodine adsorbent 1.

When silver nitrate is used as the silver compound, silver nitrate has a deliquescent property and thus the iodine-removing performance is lowered at a relative humidity of more than about 70% as in the case of $Ag_2SO_3$, but such lowering of the performance to remove $CH_3I$ can be prevented by forming a DOP film on the silver nitrate film on the iodine adsorbent.

In the foregoing embodiments, alumina is used as a carrier, but other inorganic carriers such as a silica-alumina carrier (a carrier prepared by mixing silica with alumina in an appropriate proportion) and silica gel, or organic carriers such as foamed polystyrene, etc. can be used with similar effect.

The present invention is directed to removal of radioactive iodine from an exhaust gas emitting from nuclear power plants, but is not limited thereto. For example, the present invention can be applied even to removal of impurities such as sulfur dioxide, nitrogen oxides, etc. from a flue gas at a high humidity, or at a possible high humidity, and thus has a wide field of application.

According to the present invention, the removal efficiency of organic iodine can be kept high without any lowering even at a high humidity.

What is claimed is:

1. An iodine adsorbent which comprises:
   a carrier;
   a film of iodine-adsorbent material deposited on the surface of the carrier; and
   a liquid layer of organic material selected from the group consisting of dioctyl phthalate, dioctyl sebate, or silicone oil, coated on the surface of the film, said layer comprising a hydrophobic organic material that is a better solvent for iodine than water.

2. An iodine adsorbent which comprises:
   a carrier;
   a film of iodine-adsorbent material selected from the group consisting of silver sulfate or silver sulfite deposited on the surface of the carrier; and
   a liquid layer of organic material coated on the surface of the film, said layer comprising a hydrophobic organic material that is a better solvent for iodine than water.

3. An iodine adsorbent according to claim 1 or 2, wherein the carrier is porous.

4. An iodine adsorbent which comprises:
   a porous carrier;
   a film of iodine-adsorbent material deposited on the surface of the carrier; and
   a liquid layer of organic material coated on the surface of the film, the volume of the organic material forming said layer being 0.2–0.8 times the pore volume of the carrier, said layer comprising a hydrophobic organic material that is a better solvent for iodine than water.

* * * * *